(12) United States Patent
Chu

(10) Patent No.: US 6,905,596 B2
(45) Date of Patent: Jun. 14, 2005

(54) FLUID MAGNETIZATION STRAW

(76) Inventor: Yu-Hsueh Chu, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/828,195

(22) Filed: Apr. 21, 2004

(65) Prior Publication Data
US 2004/0212470 A1 Oct. 28, 2004

(30) Foreign Application Priority Data
Apr. 22, 2003 (TW) .......................................... 092109284

(51) Int. Cl.<sup>7</sup> .............................. C02F 1/48; B01D 35/06
(52) U.S. Cl. ........................ 210/222; 335/296; 335/306
(58) Field of Search ................................. 335/296–306; 210/222–223

(56) References Cited

U.S. PATENT DOCUMENTS 4,772,387 A * 9/1988 Simoni ........................ 210/132
5,271,834 A * 12/1993 Mondiny ..................... 210/222
6,835,308 B2 * 12/2004 Elsegood ..................... 210/222

* cited by examiner

Primary Examiner—Ramon M. Barrera

(57) ABSTRACT

A fluid magnetization straw includes a hollow tube adapted as an outer tube, and at least one magnetizing member. A magnetizing member retaining end and a tube joint are configured at a minimum of one extremity of the outer tube, thereby containing the magnetizing members within the outer tube, facilitating dismantling for cleaning, and connective linkage with other application facilities and devices. At least one magnetic core structured to include a permanent magnet is configured within each of the magnetizing members. Moreover, an annular channel is formed between the magnetizing members and an inner wall of the outer tube thereof. Because of a special assemblage of the permanent magnets of the magnetic core within the magnetizing members, lines of magnetic force from such approach an inner wall in a tangential fashion through a fluid of an annular channel, thereby realizing a good fluid magnetization and ionization effect.

12 Claims, 13 Drawing Sheets

FLUID MAGNETIZATION STRAW

BACKGROUND OF THE INVENTION (a) Field of the Invention

The present invention relates to a fluid magnetization straw, and more particularly to a magnetization device that realizes magnetization and ionization of various liquids, gases, and so on, and, moreover, provides for convenient carrying by a user, thereby facilitating effective magnetization of water, beverages and air breathed.

(b) Description of the Prior Art

After undergoing magnetization, water molecules carry traces of electric charges; moreover, size of water molecule clusters diminishes. Furthermore, nuclear magnetic resonance spectroscopy has proven that, after magnetizing, the hydrogen-oxygen bond angle of the water molecule has reduced from 104.5 to 103 degrees, and that such microstructural changes realize alteration in physical chemical properties of the water, for instance: calcium and magnesium ions in the water are prevented from producing substantial crystal scaling, surface tension declines by 1~10 mN/M, dissolved oxygen concentration in the water increases by 4~6 mg/L, pH value increases by 0.4~1.0, solubility of the water increases by 20~70%, and purification speed increases by 20~90%. After undergoing effective magnetization, the water is thereby enabled to prevent buildup of scale, to inhibit corrosion in equipment pipelines, suppress growth of bacterial algae, reenforce dissolution capability, enhance lubrication capacity, improve cooling effectiveness, increase heat exchange efficiency, accelerate filtering and osmotic effectiveness, augment ablution efficacy, and a great many other functions.

In addition, fuel that has undergone magnetization also demonstrates outstanding results, including those described hereinafter:

1. Size of fuel molecule clusters diminishes, viscosity is reduced, and uniform mixing with air is realized for easy combustion, which effectively enhances combustion efficiency of the fuel by 3~20%.

2. Prevents and eliminates combustion-chamber carbon accumulation.

3. Difficult for fuel injection nozzle to become blocked.

4. Horsepower is increased by 5~15%.

5. Decreases emission measure of air pollutants, including HC, CO, $CO_2$, and so on.

The scientific world has already commenced mass-application of magnetic force technology in the field of biotechnology, with one familiar area of application being magnetization of water, whereby drinking of the water which has undergone magnetization can prevent calculus from occurring, decelerate aging process, accelerate metabolism, suppress growth in microorganisms, and so on. However, after the water has undergone magnetization, magnetization effect gradually recedes with time, and thus if magnetized beverages being marketed, including bottled magnetized water, activated water, energy water, and so on, are kept for too long a period of time the magnetization effect of the beverages is significantly decreased. Hence, a consumer wishing to drink the magnetized beverage should drink the magnetized beverage as soon as the beverage is manufactured.

Presently, magnetization devices being adapted fro application in the magnetization of water and other beverages include magnetized water drinking machines, magnetization cups, and so on, wherein a majority of such devices are relatively large in size, and must be installed at a fixed location for usage thereof, and thus not portable. Furthermore, because cost of such magnetization devices is high, therefore, willingness of a portion of the consumers to use the magnetization device declines. In addition, though dimensions of an agitating device such as a magnetization stick is relatively small, however, when required to be used, the beverage is necessarily placed within a container and agitated many times before the magnetization effect of the beverage is realized, and is thus inconvenient in usage.

SUMMARY OF THE INVENTION

A primary object of the present invention is to provide a fluid magnetization straw that provides for convenient carrying by a user, thereby facilitating effective magnetization of water, beverages and air breathed.

Another object of the present invention is to provide the fluid magnetization straw that provides for liquids and gases flowing through the fluid magnetization straw to undergo a relatively superior magnetization effect.

Yet another object of the present invention is to provide the fluid magnetization straw that provides magnetizing members within an outer tube that are of a separable and dismantleable configuration, which not only realizes a structure that is simple, moreover, allows for effortless eliminating of soiling substances, and cleaning and maintenance.

Yet another object of the present invention is to provide the fluid magnetization straw that provides for readily variation in diameter and length of the outer tube, and, moreover, facilitates increase or decrease in size and number of the magnetizing members (magnetic cores) within the outer tube, thereby achieving magnetization effects of different degree.

Still yet another object of the present invention is to provide the fluid magnetization straw that provides a structural innovation that is distinct from current marketed fluid magnetization facilities and magnetization cups in being smaller and less expensive, simple and convenient to use, and realizes distinguished effectiveness.

Still a further object of the present invention is to provide the fluid magnetization straw that allows for enlarging of dimensions, and thereby developing manufacture of large scale magnetization facilities, thus realizing magnetization of large quantities of fluids for application in everyday livelihood of people and commercial markets.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
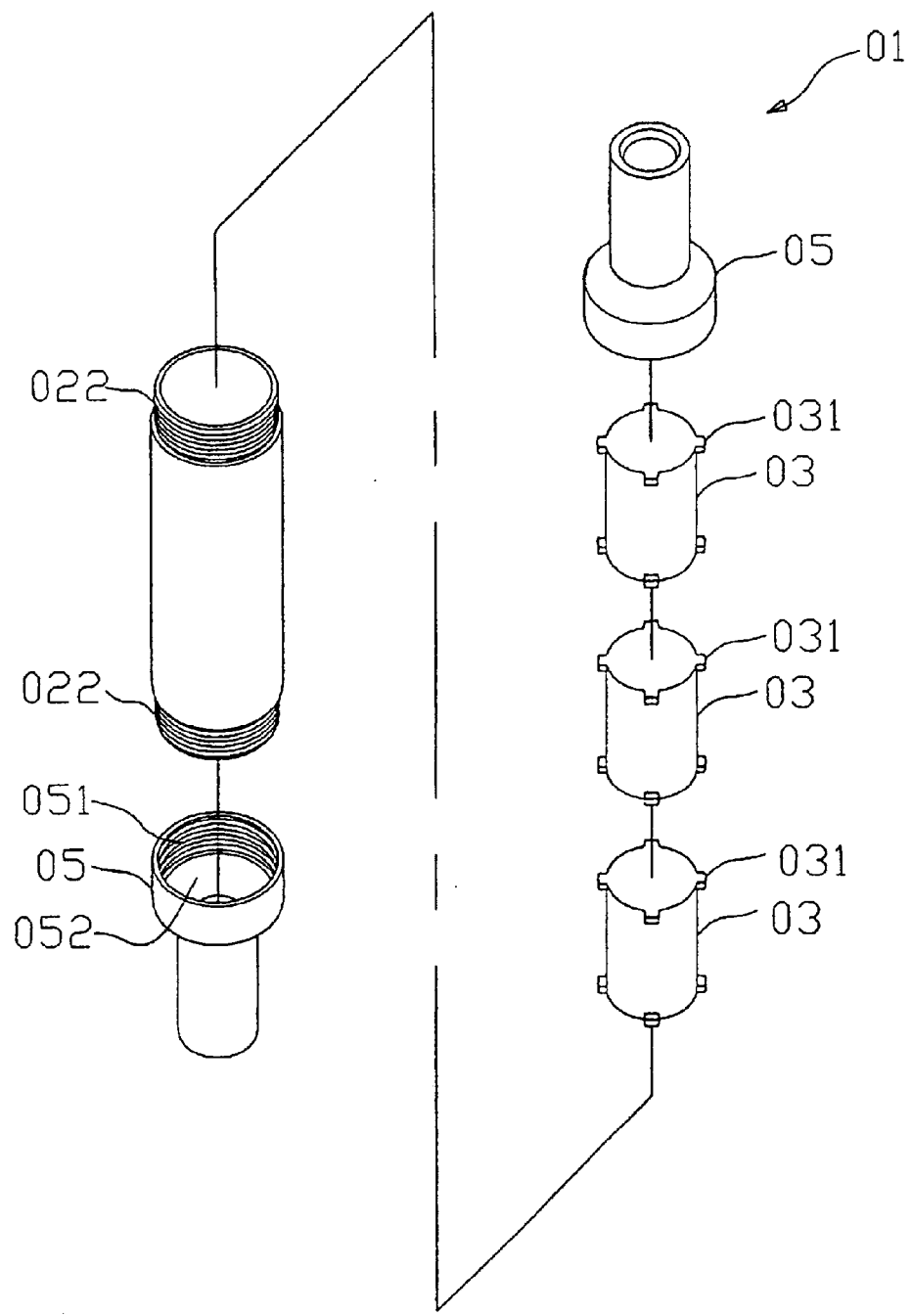
FIG. 1 shows an exploded elevational view according to the present invention.
Figure 2:
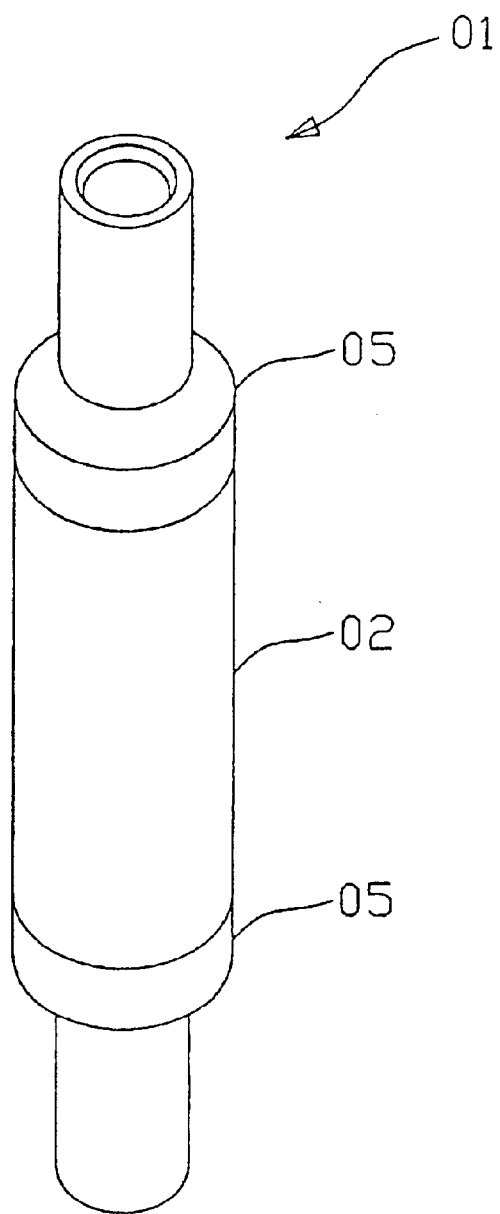
FIG. 2 shows an elevational view according to the present invention.
Figure 4:
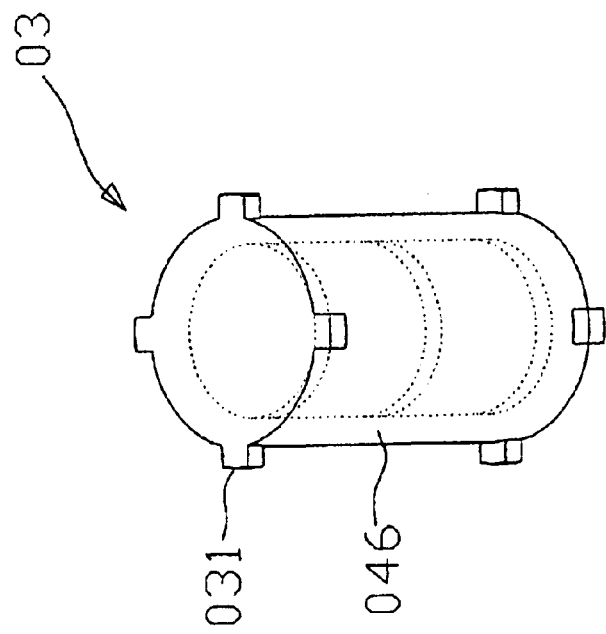
FIG. 4 shows a schematic assembled view of the magnetic core and a magnetizing member according to the present invention.
Figure 3:
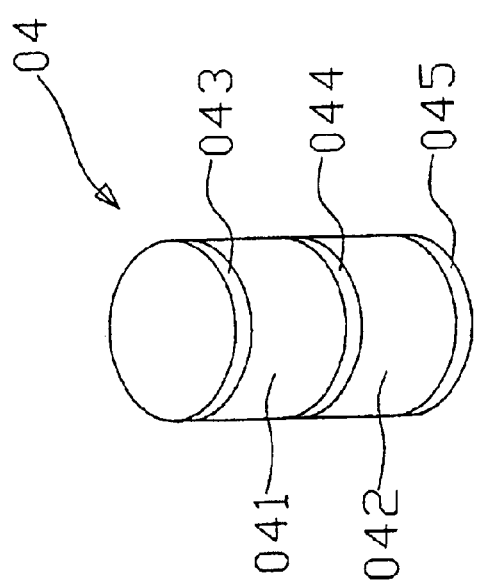
FIG. 3 shows an assembled view of a magnetic core according to the present invention.
Figure 5:
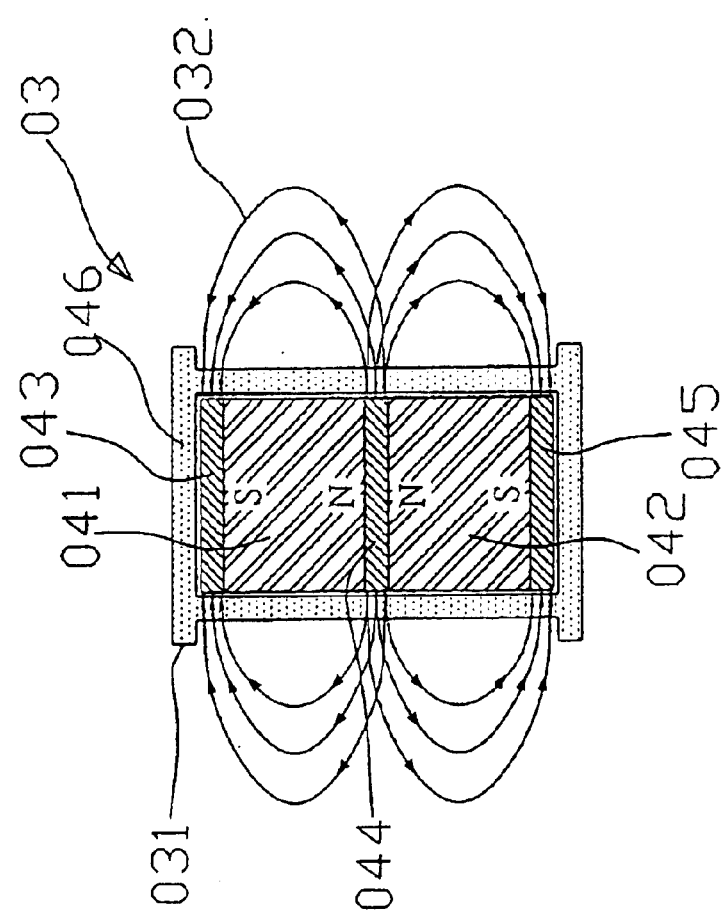
FIG. 5 shows a schematic cross sectional view of the magnetic core and the magnetizing member according to the present invention.
Figure 6:
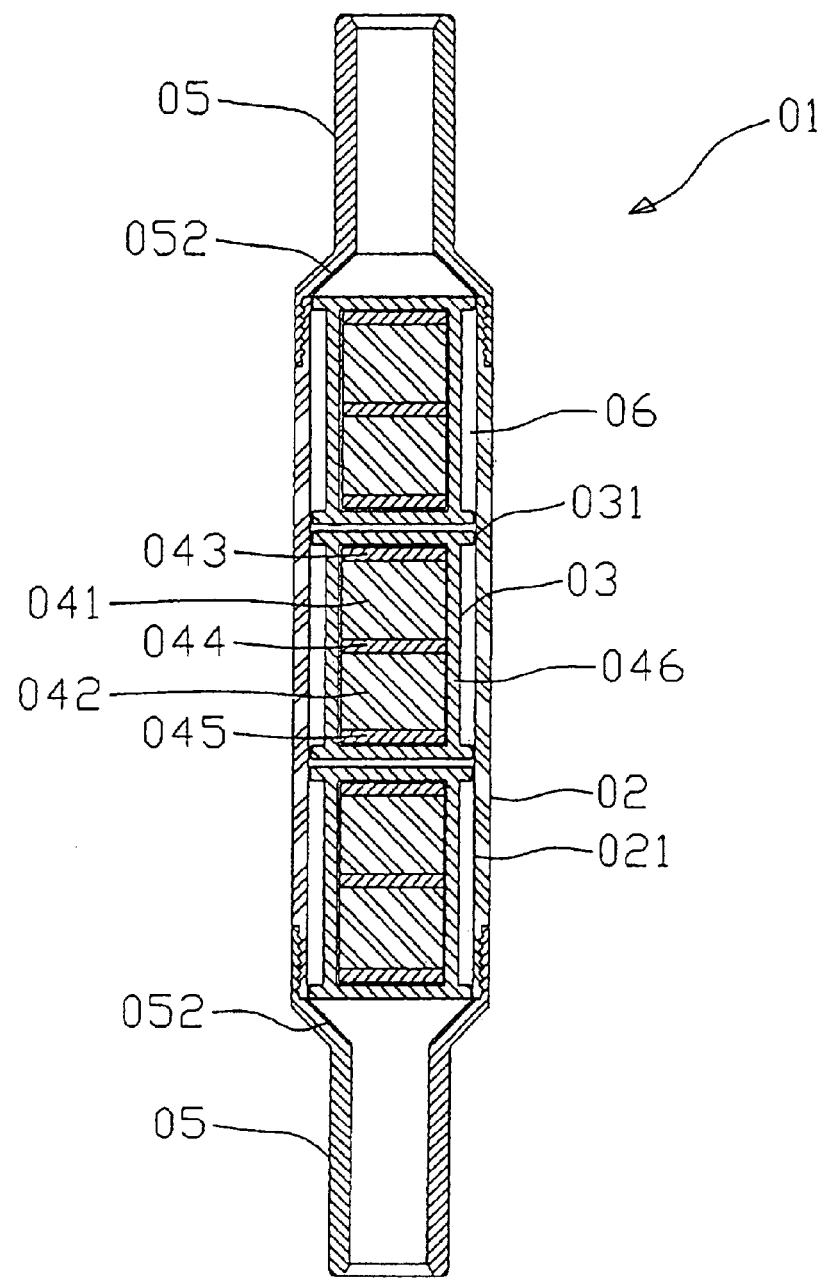
FIG. 6 shows a cross sectional view according to the present invention.

Referring to FIGS. 1 and 2, which show a fluid magnetization straw 01 structured to comprise an outer tube 02, three magnetizing members 03, and two tube joints 05. Wherein, screw threads 022 for screw locking to the tube joints 05 are configured on each of two extremities of the outer tube 02, and screw threads 051 for screw locking to the outer tube 02 are configured in one end of each of the tube joints 05. Furthermore, as depicted in FIGS. 3 and 4, a magnetic core 04 is configured within each of the magnetizing members 03, whereby each of the magnetic cores 04 is structured to comprise two magnets 041 and 042, and three magnetically permeance discs 043, 044 and 045. A water-repellent and airproof magnetic core envelope 046 is configured as a layer and encompasses a periphery of each of the magnetic cores 04, whereby the magnetic core envelope 046 securely encloses the two magnets 041 and 042 and the three magnetically permeance discs 043, 044 and 045, moreover, the magnetic core envelope 046 prevents phenomenon of oxidization and corrosion from occurring. Referring to FIG. 5, wherein the two magnets 041 and 042 are disposed in a fashion such that north poles of the two magnets 041 and 042 face one another, and thereby mutually repel, moreover, the two magnets 041 and 042 and three magnetically permeance discs 043, 044 and 045 are compactly adjoined. With the north poles of the two magnets 041 and 042 so disposed so that they mutually repel, the magnetically permeance disc 044 between the two magnets 041 and 042 focuses lines of magnetic force 032 emitting from the north poles, and outwardly excites same therefrom, which thereon proceed through shortest routes towards the two magnetically permeance discs 043 and 045 configured on sides of the magnets 041 and 042 respectively, whereupon a confluence of the lines of magnetic force 032 respectively penetrate south poles of the two magnets 041 and 042. Furthermore, as depicted in FIGS. 4 and 6, eight anchoring flanges 031 are configured on each of the magnetic core envelopes 046, thereby enabling the magnetizing members 03 to be anchored within the outer tube 02 therewith, moreover, an annular channel 06 is formed between the magnetizing members 03 and the inner wall 021 of the outer tube 02 thereof. Because the lines of magnetic force 032 from the magnets 041 and 042 of the magnetic core 04 configured within the magnetizing member 03 approach the inner wall 021 in a tangential fashion through the three magnetically permeance discs 043, 044 and 045 and thereon through a fluid of the annular channel 06, thus, a good fluid magnetization and ionization effect is realized thereof. Tapered retaining ends 052 are further configured on the tube joints 05 of the fluid magnetization straw 01, and upon screw locking the tube joints 05 to the outer tube 02, the magnetizing members 03 are supportively localized within the outer tube 02 by means of retaining support of the tapered retaining ends 052 and the screw threads 051 configured on the tube joints 05 of the fluid magnetization straw 01, and, moreover, a smooth fluid flow through a channel is actualized thereof.

Figure 7:
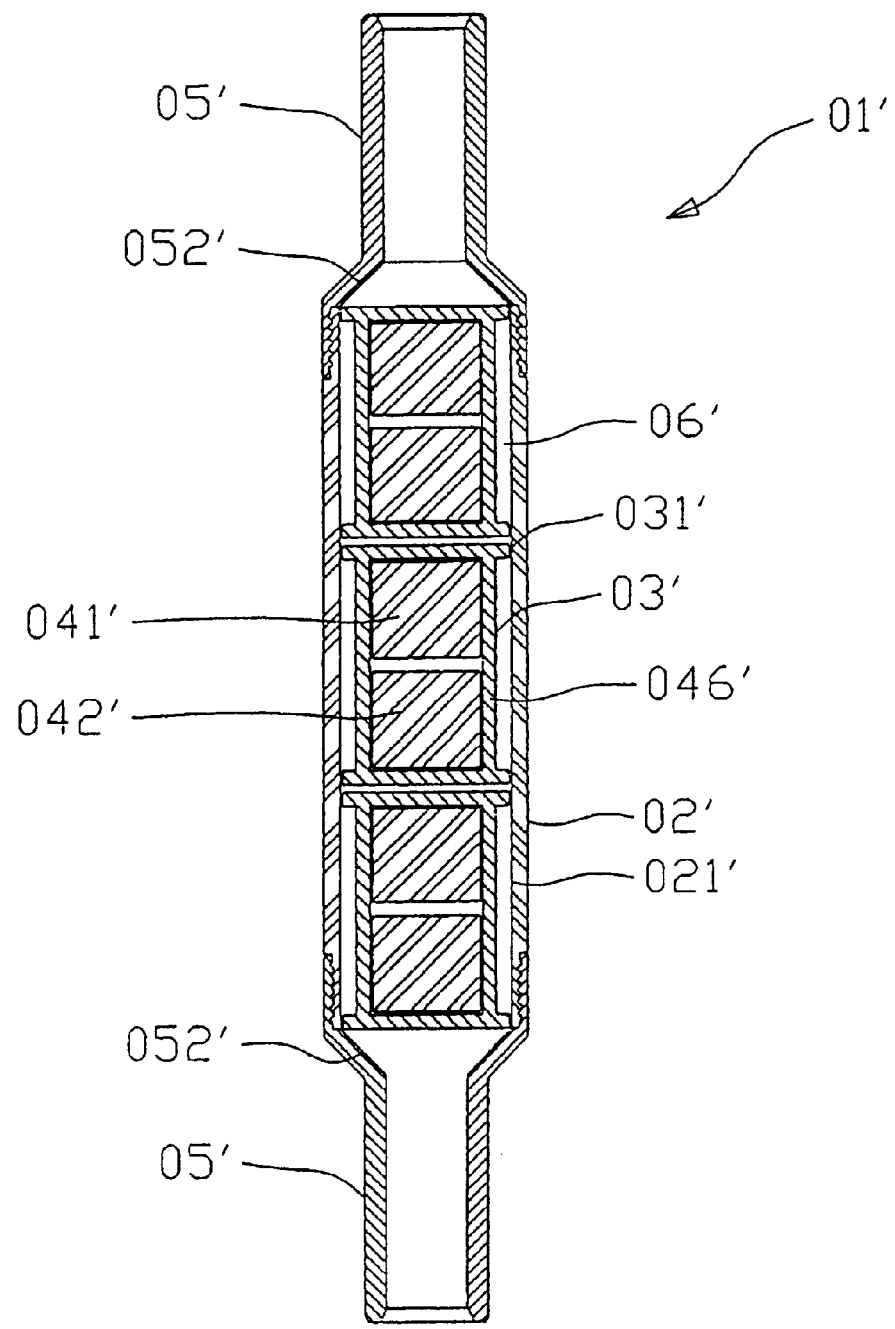
FIG. 7 shows a cross sectional view of the magnetic core and the magnetizing member according to the present invention.
Figure 9:
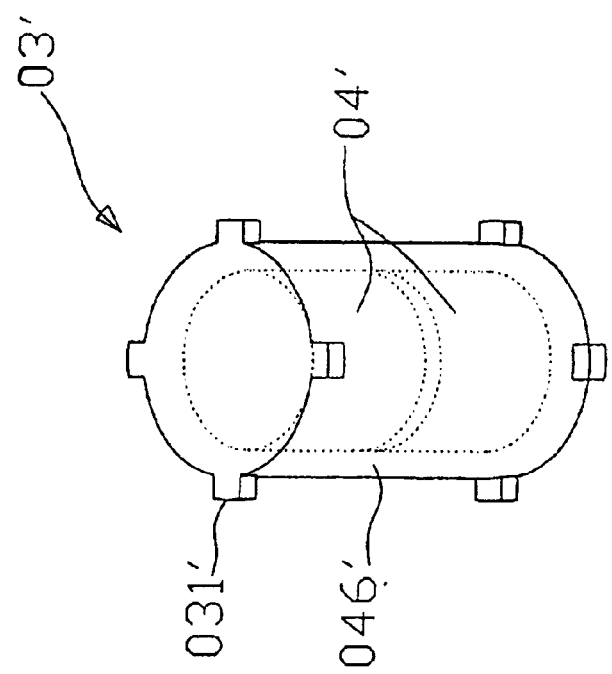
FIG. 9 shows another schematic cross sectional view of the magnetic core and the magnetizing member according to the present invention.
Figure 8:
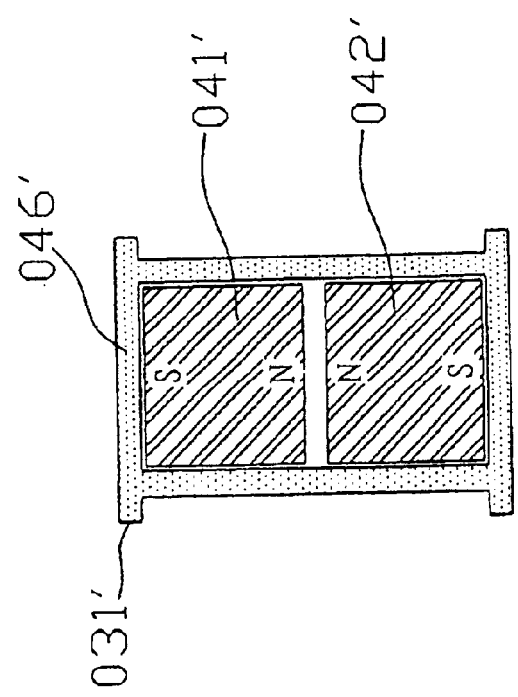
FIG. 8 shows a schematic assembled view of another magnetic core and the magnetizing member according to the present invention.
Figure 10:
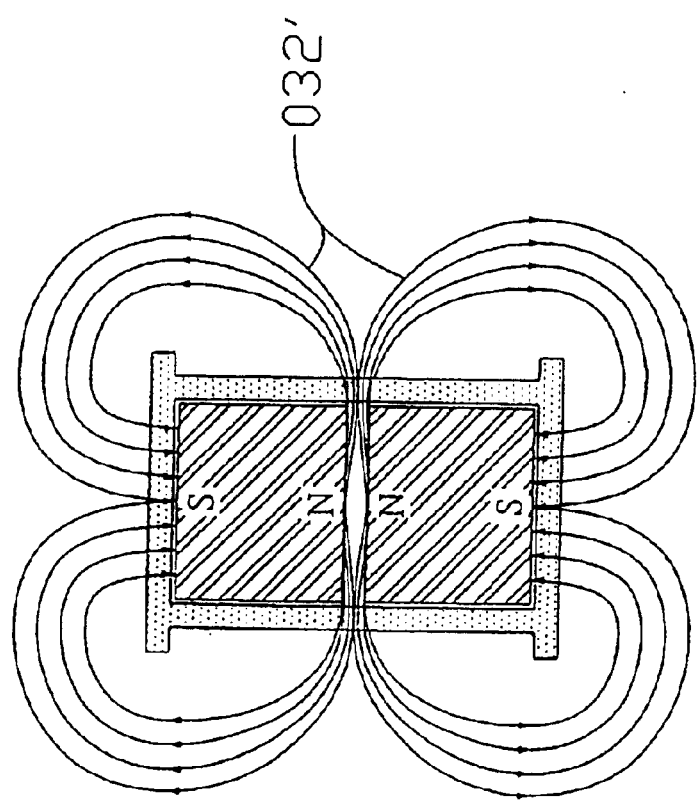
FIG. 10 shows a schematic assembled view of the other magnetic core and the magnetizing member according to the present invention.

Referring to FIG. 7, which shows a fluid magnetization straw 01' structured to comprise an outer tube 02', three magnetizing members 03', and two tube joints 05'. Wherein, screw threads 022' for screw locking to the tube joints 05' are configured on each of two extremities of the outer tube 02', and screw threads 051' for screw locking to the outer tube 02' are configured in one end of each of the tube joints 05'. As depicted in FIGS. 8, 9 and 10, a magnetic core 04' is configured within each of the magnetizing members 03', whereby each of the magnetic cores 04' is structured to comprise two magnets 041' and 042'. A water-repellent and airproof magnetic core envelope 046' is configured as a layer and encompasses a periphery of each of the magnetic cores 04', whereby the magnetic core envelope 046' securely encloses the two magnets 041' and 042', and, moreover, the magnetic core envelope 046' prevents phenomenon of oxidization and corrosion from occurring. The two magnets 041' and 042' are disposed in a fashion such that north poles of the two magnets 041' and 042' face one another, and thereby mutually repel. Upon mutual approach of the north poles of the two magnets 041 and 042, because the two north poles mutually repel, lines of magnetic force 032' emitting from the north poles will pass between the two magnets 041' and 042' and be outwardly excited therefrom, and thereon respectively proceed through shortest route towards south poles of the two magnets 041' and 042. Referring to FIGS. 7, 9 and 10, eight anchoring flanges 031' are configured on each of the magnetic core envelopes 046', thereby enabling the magnetizing members 03' to be anchored within the outer tube 02' therewith, moreover, an annular channel 06' is formed between the magnetizing members 03' and the inner wall 021' of the outer tube 02' thereof. Because the lines of magnetic force 032' from the magnets 041' and 042' of the magnetic core 04' configured within the magnetizing member 03' approach the inner wall 021 in a tangential fashion through a fluid of the annular channel 06', thus, a good fluid magnetization and ionization effect is realized thereof.

As depicted in FIG. 7, tapered retaining ends 052' are further configured on the tube joints 05' of the fluid magnetization straw 01', and upon screw locking the tube joints 05' to the outer tube 02', the magnetizing members 03' are supportively localized within the outer tube 02' by means of retaining support of the tapered retaining ends 052' and the screw threads 051' configured on the tube joints 05' of the fluid magnetization straw 01', and, moreover, a smooth fluid flow through a channel is actualized thereof.

Figure 11:
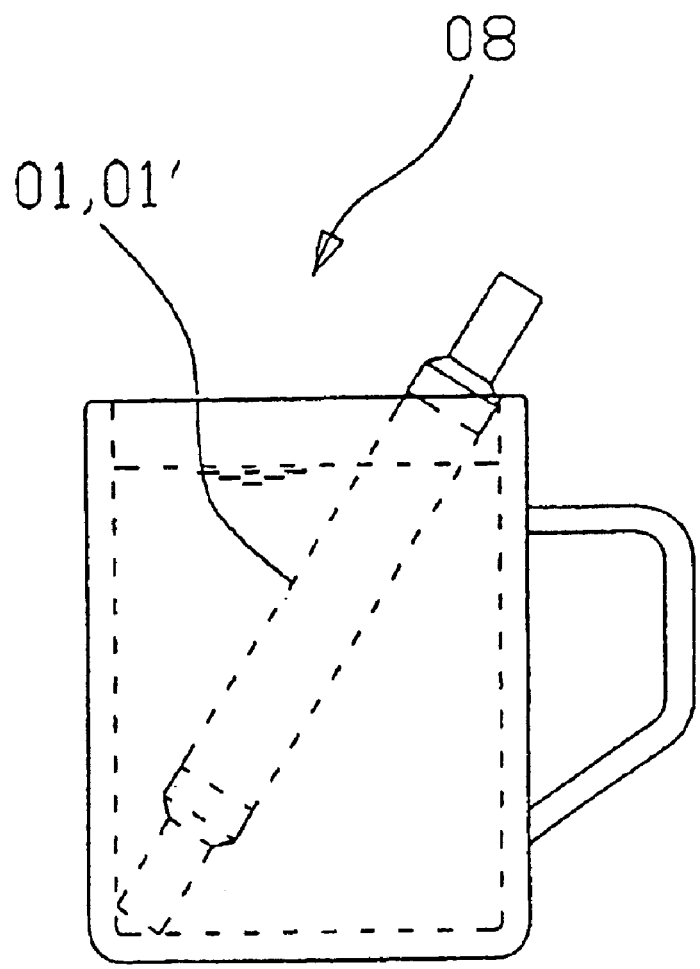
FIG. 11 shows a schematic view of a first example of usage according to the present invention.
Figure 12:
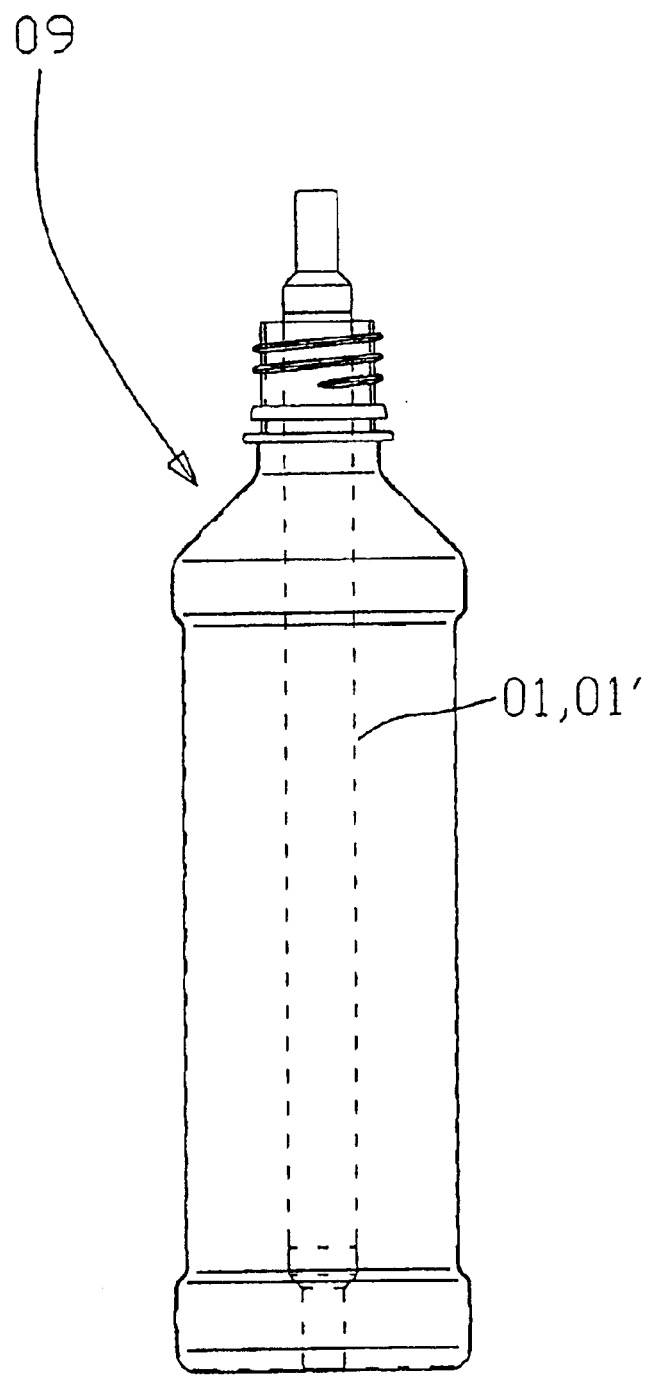
FIG. 12 shows a schematic view of a second example of usage according to the present invention.
Figure 13:
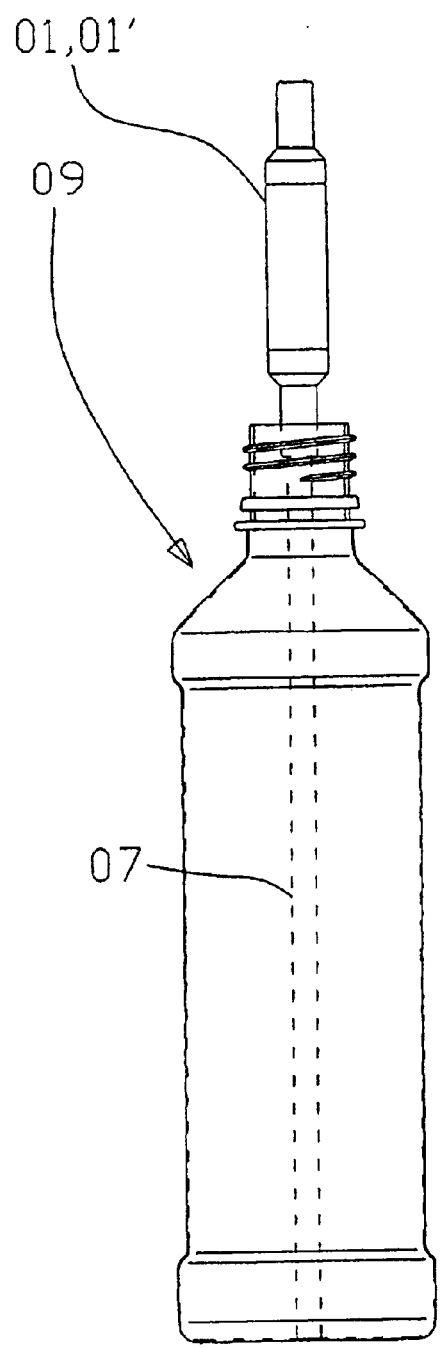
FIG. 13 shows a schematic view of a third example of usage according to the present invention.

Referring to FIGS. 11 and 12, the fluid magnetization straw 01 or 01' can be utilized in a drinking cup filled with a beverage 08 or a bottled beverage 09, whereby while drinking the beverage 08 or 09, the fluid magnetization straw 01 or 01' simultaneously magnetizes the beverage 08 or 09. The fluid magnetization straw 01 or 01' of the present invention can also be applied in conjunction with a common straw 07, as depicted in FIG. 13, whereby the fluid magnetization straw 01 or 01' is connected to and thereby used together with the common straw 07, thereby magnetizing the beverage 09 a user wishes to drink.

Figure 14:
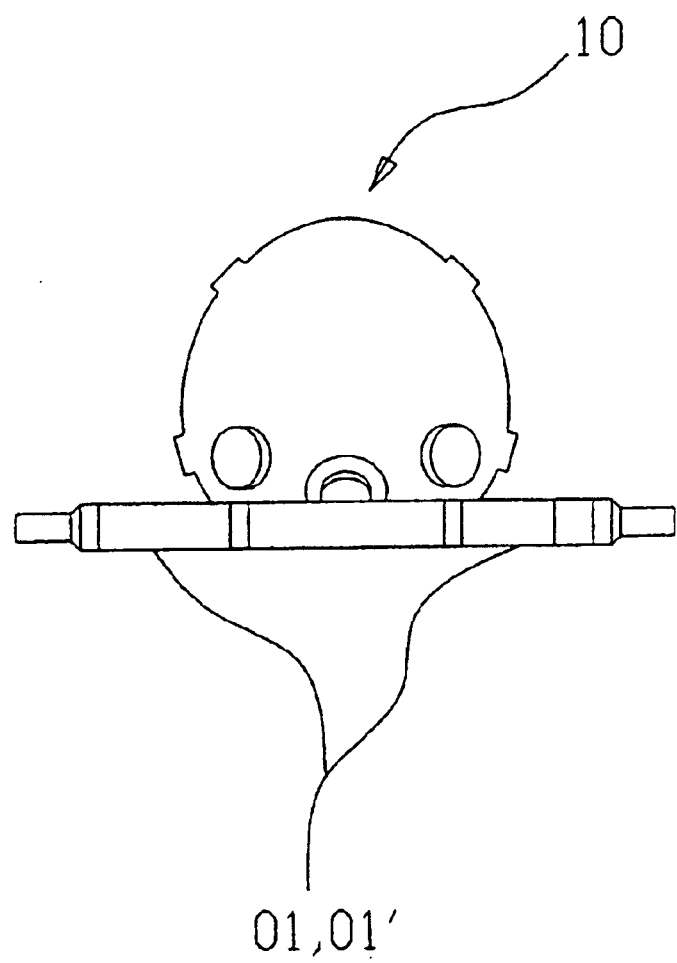
FIG. 14 shows a schematic view of a fourth example of usage according to the present invention.
Figure 15:
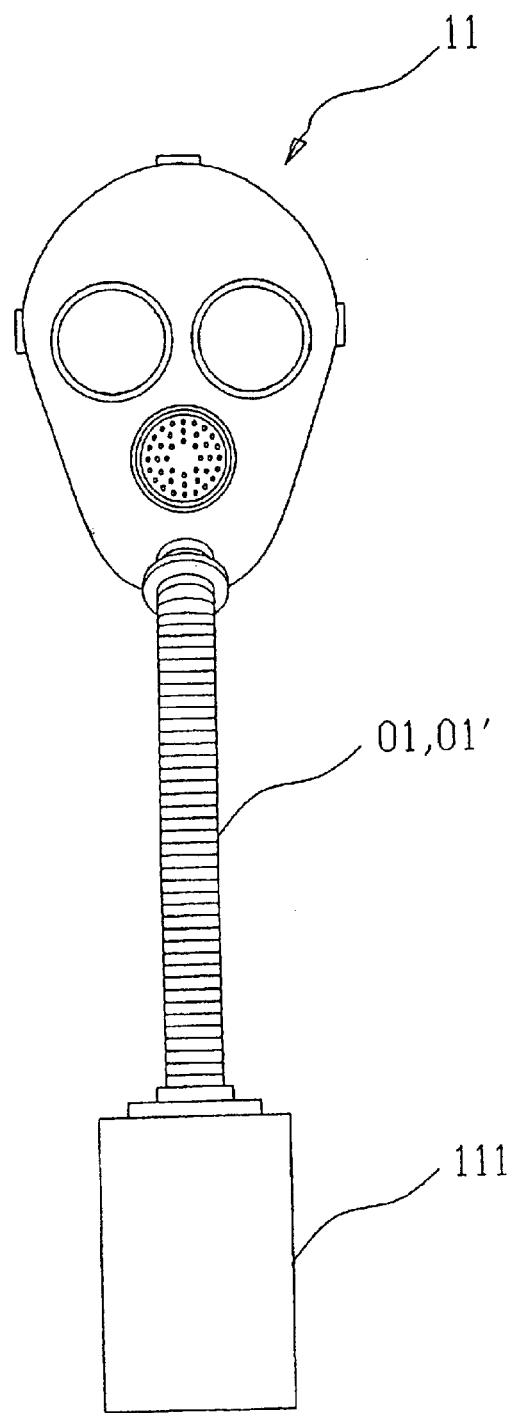
FIG. 15 shows a schematic view of a fifth example of usage according to the present invention.

Referring to FIGS. 14 and 15, which show the fluid magnetization straw 01 or 01' of the present invention being employed for application in a breathing tube for a respirator 10 or for application in the breathing tube for a bio-chemical anti-virus mask 11, whereby the fluid magnetization straw 01 or 01' is connected to a canister 111, thereby realizing ionization of air molecules and particles (such as microorganisms including viruses, bacteria, fungi, and so on) by means of the magnetization effect of the fluid magnetization straw 01 or 01', and thus the individual microorganisms are caused to carry traces of electrical charge, which thereby interrupts damage to mass transfer effect, suppresses fission proliferation, and further exterminates pathogenic microorganisms within the air.

Because the fluid magnetization straws 01 and 01' can be utilized as a portable magnetization device, effective magnetization of drinking water and beverages and air breathed can be realized, and thus can be employed in preventing calculus, to decelerate the ageing process, accelerate metabolism, exterminate pathogenic microorganisms, and so on. Hence, the fluid magnetization straws 01 and 01' provide a positive help in enhancing health of the human body and safeguard from disease.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A fluid magnetization straw comprising an outer tube, and one or at least one magnetizing member, the outer tube is a hollow tube, a magnetizing member retaining end and a tube joint are configured at a minimum of one extremity of two extremities of the outer tube, thereby effectively containing the magnetizing members within the outer tube, and, moreover, facilitating dismantling for cleaning, and connective linkage with other application facilities and devices; at least one magnetic core is configured within the magnetizing members, whereby each of the magnetic cores is structured to comprise one or at least one permanent magnet, and two or at least two magnetically permeance discs; a water-repellent and airproof magnetic core envelope is configured as a layer and encompasses a periphery of each of the magnetic cores, a plurality of anchoring flanges are configured on the magnetic core envelopes, thus enabling the magnetizing members to be anchored within the outer tube therewith, and an annular channel is formed between the magnetizing members and an inner wall of the outer tube thereof; lines of magnetic force from the permanent magnets of the magnetic cores configured within the magnetizing members approach the inner wall in a tangential fashion through the magnetically permeance discs and thereon flow through a fluid of the annular channel.

2. The fluid magnetization straw according to claim 1, wherein range of fluids that can be magnetized covers a variety of liquids and gases.

3. The fluid magnetization straw according to claim 1, wherein the fluid magnetization straw can be adapted for application in small scale beverage magnetization straws, wherewith a user, while drinking a beverage, can directly magnetize the beverage.

4. The fluid magnetization straw according to claim 1, wherein the fluid magnetization straw can be adapted for application in conjunction with a common straw, whereby the fluid magnetization straw is connected to and thereby used together with the common straw, thereby magnetizing the beverage as the user drinks.

5. The fluid magnetization straw according to claim 1, wherein the fluid magnetization straw can be manufactured to produce medium and large-scale fluid magnetization devices, application of which can realize magnetization of large quantities of fluids.

6. The fluid magnetization straw according to claim 1, wherein the fluid magnetization straw can be disposed in a breathing tube of a respirator or disposed in a breathing tube of a gas mask, thereby realize magnetization of air breathed.

7. A fluid magnetization straw comprising the outer tube, and one or at least one magnetizing member, the outer tube is a hollow tube, the magnetizing member retaining end and the tube joint are configured at a minimum of one extremity of two extremities of the outer tube, thereby effectively containing the magnetizing members within the outer tube, moreover, facilitating dismantling for cleaning, and connective linkage with other application facilities and devices; at least one magnetic core is configured within the magnetizing members, whereby each of the magnetic cores is structured to comprise at least one permanent magnet; the water-repellent and airproof magnetic core envelope is configured as a layer and encompasses the periphery of each of the magnetic cores, a plurality of anchoring flanges are configured on the magnetic core envelopes, thereby enabling the magnetizing members to be anchored within the outer tube therewith, and an annular channel is formed between the magnetizing members and the inner wall of the outer tube thereof; the permanent magnets within the magnetizing members are disposed in a fashion such that like poles of the permanent magnets face one another, and thereby mutually repel, lines of magnetic force from the magnetizing members approach the inner wall in a tangential fashion through the fluid of the annular channel.

8. The fluid magnetization straw according to claim 7, wherein range of fluids that can be magnetized covers a variety of liquids and gases.

9. The fluid magnetization straw according to claim 7, wherein the fluid magnetization straw can be adapted for application in small scale beverage magnetization straws, wherewith the user, while drinking a beverage, can directly magnetize the beverage.

10. The fluid magnetization straw according to claim 7, wherein the fluid magnetization straw can be adapted for application in conjunction with the common straw, whereby the fluid magnetization straw is connected to and thereby used together with the common straw, thereby magnetizing the beverage as the user drinks.

11. The fluid magnetization straw according to claim 7, wherein the fluid magnetization straw can be manufactured to produce medium and large-scale fluid magnetization devices, application of which can realize magnetization of large quantities of fluids.

12. The fluid magnetization straw according to claim 7, wherein the fluid magnetization straw can be disposed in the breathing tube of a respirator or disposed in the breathing tube of a gas mask, thereby realize magnetization of air breathed.

* * * * *